Oct. 24, 1950     E. L. LANDON     2,527,432
FOOD SERVICE CABINET
Filed April 14, 1947     2 Sheets-Sheet 1
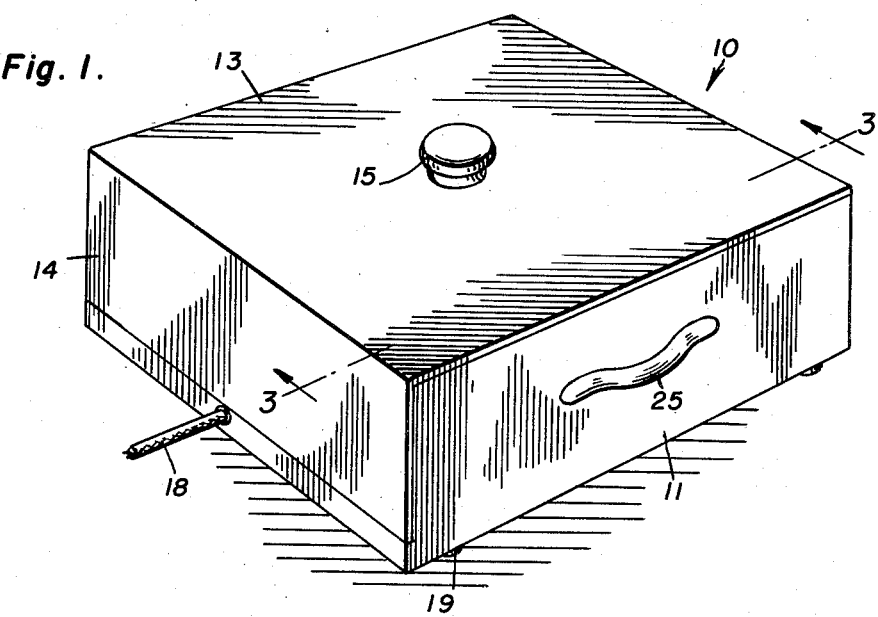
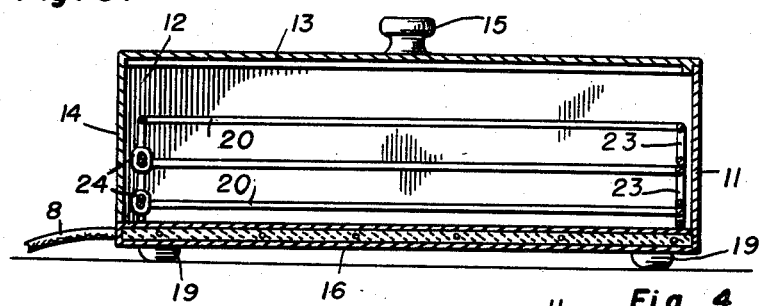
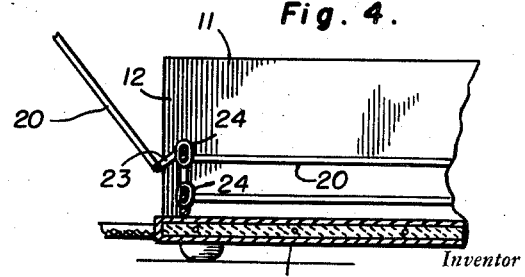
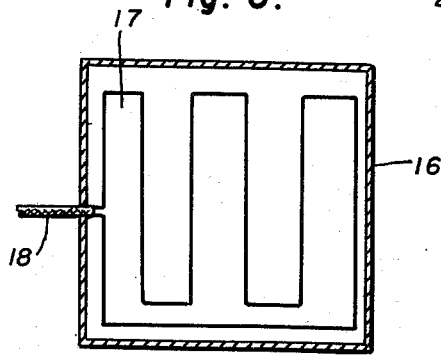
Inventor
Eleanor Louise Landon
By *Clarence A. O'Brien and Harvey B. Jacobson*
Attorneys Oct. 24, 1950     E. L. LANDON     2,527,432
FOOD SERVICE CABINET
Filed April 14, 1947     2 Sheets-Sheet 2
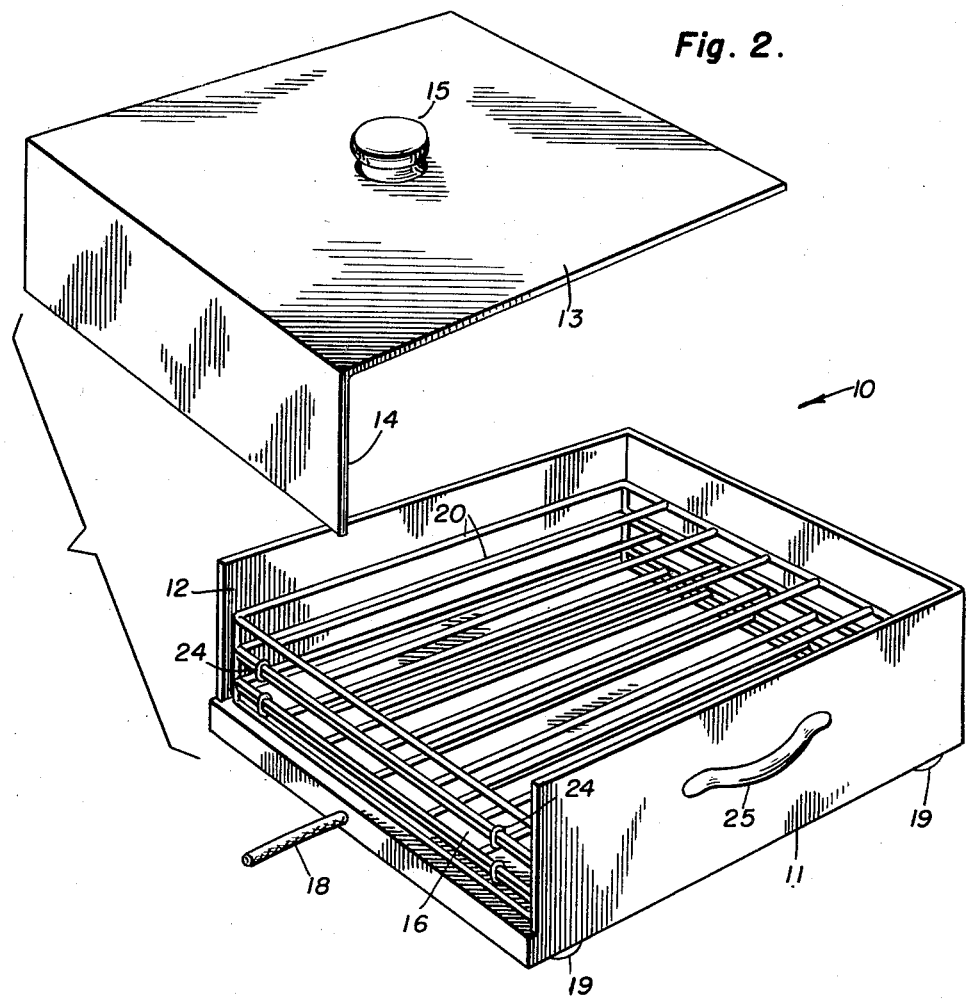
Fig. 2.
Fig. 5.
Inventor
Eleanor Louise Landon
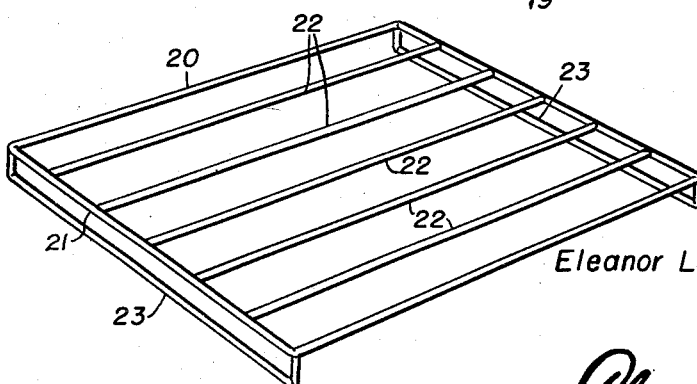
By
Attorneys Patented Oct. 24, 1950

2,527,432

UNITED STATES PATENT OFFICE 2,527,432

FOOD SERVICE CABINET

Eleanor Louise Landon, Seattle, Wash.

Application April 14, 1947, Serial No. 741,319

2 Claims. (Cl. 99—448)

This invention relates to new and useful improvements and structural refinements in food service cabinets, and the principal object of the invention is to provide a device of the character herein described, which may be conveniently and effectively employed as a portable storage container for cakes, pies, waffles, pastry, or the like, between the time such food is prepared in the kitchen and the time it is subsequently transferred to the dining table, matters being so arranged that the food in the cabinet is preserved at a warm degree of temperature and is prevented from becoming "soggy" or otherwise detrimentally affected by rapid external and relatively slow internal cooling.

Another object of the invention is to provide a food service cabinet in which the food may be arranged in superimposed, vertically spaced layers, and which, as a whole, may be conveniently transported from one location to another.

A further object of the invention is to provide a food service cabinet which is simple in construction, pleasing in appearance, and which will readily lend itself to economical manufacture.

An additional object of the invention is to provide a food service cabinet which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 1 is a perspective view of the invention, showing the same in the closed position;

Figure 2 is a perspective view, similar to that shown in Figure 1, but illustrating the cover removed from the cabinet;

Figure 3 is a cross-sectional view, taken substantially in the plane of the line 3—3 in Figure 1;

Figure 4 is a fragmentary cross-sectional view, similar to that shown in Figure 3, but illustrating one of the food carrying racks in an outwardly swung position;

Figure 5 is a perspective view of one of the racks used in the invention; and

Figure 6 is a diagrammatic view of a heating element or plate also used in the invention.

Like characters of reference are used to designate like parts in the specification and throughout the several views.

Referring now to the accompanying drawings in detail, the invention consists of a food service cabinet designated generally by the reference character 10, the same embodying in its construction a four sided container 11 provided with an open side 12 and with an open top, as is best shown in Figure 2.

A cover 13, having a substantially L-shaped cross-sectional configuration, is removably positioned on the open top of the container, the down-turned flange 14 of the cover closing the open side 12, as will be clearly understood. The cover 13 may be equipped with a suitable hand knob 15 for obvious reasons.

An electric heating plate 16 constitutes the bottom of the container 11, the plate 16 being of more-or-less conventional design and including a resistance element 17 energized by the current conductor 18. The underside of the plate 16 is equipped with a plurality of knobs 19 which function as supporting legs for the cabinet as a whole.

It will be noted that by virtue of these legs, the cabinet will be supported in an elevated position, so that the heat from the plate 16 does not damage the table top, or the like, on which the cabinet may stand.

A plurality of superimposed, vertically spaced racks 20 are positioned in the container 11, these racks being constructed from wire rod and being best illustrated in the accompanying Figure 5.

It will be noted that each of these racks consists of a perimetric frame 21 provided with a plurality of crossbars 22 and with a pair of supporting legs or rails 23.

These rails are of a substantially U-shaped configuration and extend downwardly from the relatively opposite ends of the frame 21, as will be clearly understood. The various pieces of wire rod from which the racks are formed are secured together in a suitable manner, such as for example, by welding, or the like.

A pair of wire loops 24 are employed for hingedly connecting one of the rails of each rack to the frame of the underlying rack, while the lowermost rack rests upon the upper surface of the heating plate 16.

By virtue of this arrangement, the racks 20 may be swung outwardly after the cover 13 is removed from the container, this being illustrated in the accompanying Figure 4.

It should be added that the outward swing of the racks is facilitated by the provision of the open container side 12.

When the invention is placed in use, the food may be positioned upon the racks 20 and the entire cabinet may be placed in the oven so that when it is subsequently transferred to the dining table, the necessary amount of heat will be retained in the cabinet to preserve the food at a proper degree of temperature.

In this connection, it will be noted that the food may lose some of its original heat, but this loss will take place uniformly (by virtue of the spacing of the racks 20) and the quality of the food will not be impaired.

If it is not convenient to place the cabinet in the oven, the same may be positioned on the table, or the like, and the heating plate 16 may be energized so as to maintain the food in the cabinet at the proper degree of temperature. It should, of course, be understood that the heating effect of the plate 16 is sufficient only for this purpose.

Finally, if desired, the container 11 may be provided with a suitable carrying handle 25, as will be clearly apparent.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A food service cabinet comprising in combination, a container and a removable cover thereon, a plurality of superimposed, vertically spaced racks provided in said container, each of said racks being formed from wire rod and comprising a perimetric frame, a plurality of cross-bars secured to said frame, and a pair of downwardly extending rest rails provided at the relatively opposite ends of said frame, one of said rails on each rack being hingedly connected to the frame of the underlying rack.

2. A food service cabinet comprising in combination, a container having an open side and an open top, a one-piece removable cover provided on said open side and top, a plurality of superimposed, vertically spaced racks positioned in said container, each of said racks being formed from wire rod and comprising a perimetric frame, a plurality of cross-bars secured to said frame, a pair of downwardly extending rest rails provided at the relatively opposite ends of said frame, a pair of wire loops hingedly connecting one of said rails on each rack to the frame of the underlying rack, and an electric heating plate constituting the bottom of said container, the lowermost of said racks resting upon said plate.

ELEANOR LOUISE LANDON.

REFERENCES CITED

The following references are of record in the file of this patent:

UNITED STATES PATENTS

| Number | Name | Date |
| --- | --- | --- |
| 659,316 | Peach | Oct. 9, 1900 |
| 921,694 | Hall | May 18, 1909 |
| 949,661 | Richter | Feb. 15, 1910 |
| 1,493,478 | Dake | May 13, 1924 |
| 1,809,867 | Rittberger | June 16, 1931 |
| 1,903,477 | Rolfson | Apr. 11, 1933 |